United States Patent [19]

Mathewes, Jr. et al.

[11] Patent Number: 4,841,434
[45] Date of Patent: Jun. 20, 1989

[54] CONTROL SEQUENCER WITH DUAL MICROPROGRAM COUNTERS FOR MICRODIAGNOSTICS

[75] Inventors: James K. Mathewes, Jr., Northborough; Jan S. Hermam, Holliston; Stephen C. Johnson, Waltham; Richard B. Goud, Concord; Jack J. Stiffler, Hopkinton, all of Mass.

[73] Assignee: Raytheon Company, Lexington, Mass.

[21] Appl. No.: 42,560

[22] Filed: Apr. 27, 1987

Related U.S. Application Data

[63] Continuation of Ser. No. 609,602, May 11, 1984, abandoned.

[51] Int. Cl.$^4$ .................. G06F 11/00; G06F 9/22
[52] U.S. Cl. .................. 364/200; 364/267.4; 364/267.7; 364/262.7; 364/262.8; 364/213; 371/19
[58] Field of Search ............... 371/15, 19; 364/200 MS File, 900 MS File

[56] References Cited

U.S. PATENT DOCUMENTS

| | | | |
|---|---|---|---|
| 3,805,039 | 4/1974 | Stiffler | 235/153 |
| 3,988,579 | 10/1976 | Bottard et al. | 235/153 |
| 4,048,481 | 9/1977 | Bailey, Jr. et al. | 235/153 AK |
| 4,095,094 | 6/1978 | Struger et al. | 364/900 |
| 4,127,768 | 11/1978 | Negi et al. | 235/304.1 |
| 4,167,779 | 9/1979 | Sullivan et al. | 364/200 |
| 4,254,461 | 3/1981 | Chemla et al. | 364/200 |
| 4,254,463 | 3/1981 | Busby et al. | 364/200 |
| 4,258,420 | 3/1981 | Negi et al. | 364/200 |
| 4,310,879 | 1/1982 | Pandeya | 364/200 |
| 4,317,171 | 2/1982 | Maejima et al. | 364/200 |
| 4,320,453 | 3/1982 | Roberts et al. | 364/200 |
| 4,355,389 | 10/1982 | Sato et al. | 371/18 |
| 4,429,368 | 1/1984 | Kurii | 364/580 |

FOREIGN PATENT DOCUMENTS

| | | |
|---|---|---|
| 0059810 | 9/1982 | European Pat. Off. |
| 1425110 | 2/1976 | United Kingdom |
| 1436428 | 5/1976 | United Kingdom |
| 1437217 | 5/1976 | United Kingdom |
| 1457604 | 12/1976 | United Kingdom |
| 1459851 | 12/1976 | United Kingdom |
| 1596850 | 9/1981 | United Kingdom |

*Primary Examiner*—Gareth D. Shaw
*Assistant Examiner*—Christina M. Eakman
*Attorney, Agent, or Firm*—Walter F. Dawson; Richard M. Sharkansky

[57] ABSTRACT

A microprogrammed control unit of an information processing system having a control sequencer with dual microprogram counters for performing microdiagnostics simultaneously with performing macroprograms. The microdiagnostics comprise background and operability tests, the background tests being interleaved with macroinstruction operations under the control of the two independent microprogam counters. The background tests are run during processor idle time and the operability tests are executed at processor turn-on. The organization of the microdiagnostics into a hierarchical structure allows the use of the same microprogrammed test module for both the background and operability microdiagnostic tests. A prediction/residual coding technique provides fault detection for address and data information within the control sequencer.

21 Claims, 8 Drawing Sheets

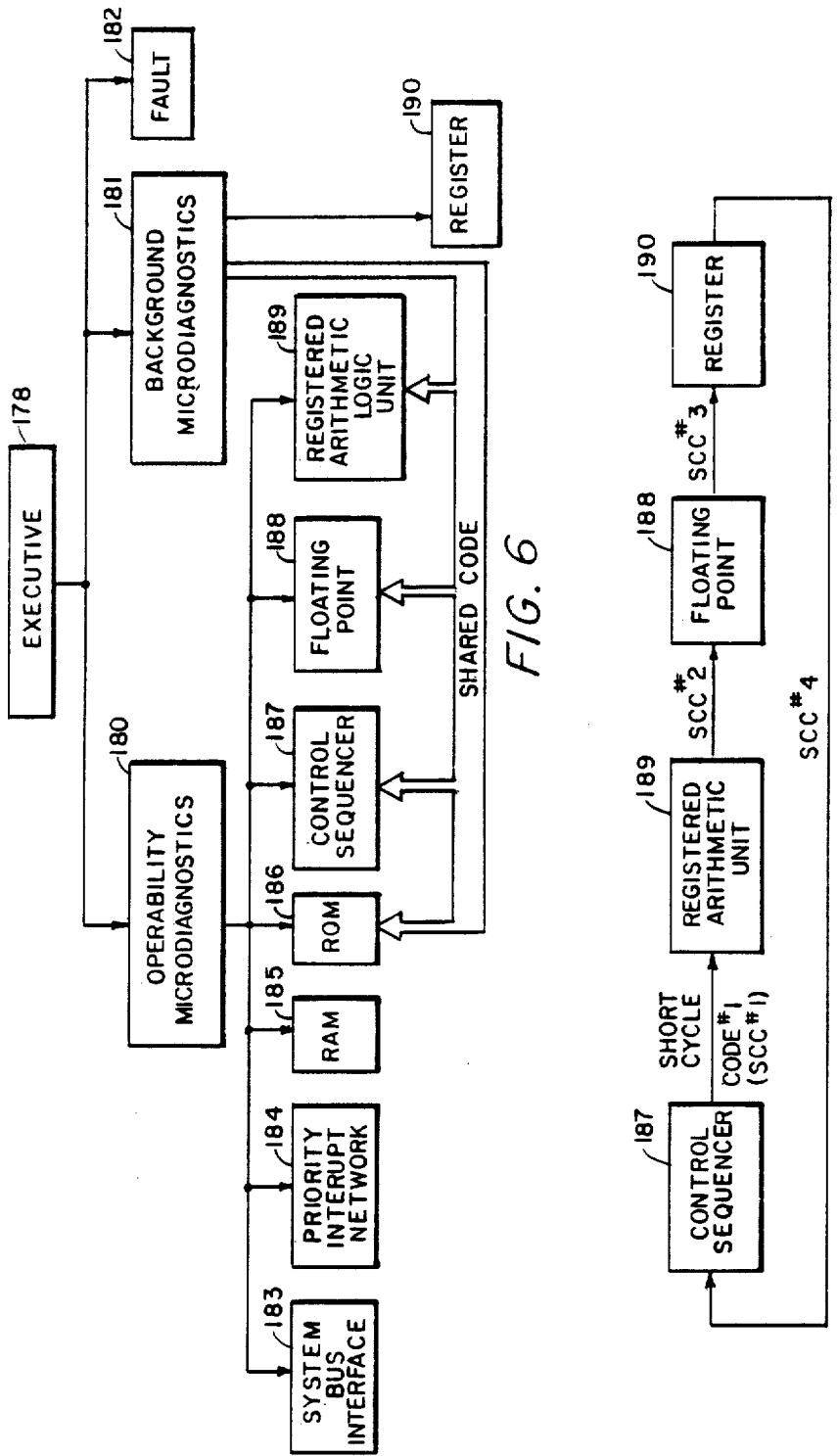

X ~ BIT PARTICIPATES IN PARITY TREE

CONTROL SEQUENCER WITH DUAL MICROPROGRAM COUNTERS FOR MICRODIAGNOSTICS

The Government has rights in this invention pursuant to Contract No. DAAK80-81-C-0053 awarded by the Department of the Army.

This application is a continuation of application Ser. No. 609,602, filed May, 11, 1984, now abandoned.

BACKGROUND OF THE INVENTION

This invention relates to an information processing system having self-test capability. More particularly, it relates to a digital computer system having microdiagnostic test routines that test hardware portions of a computer system in conjunction with Built-in Test (BIT) hardware and macro-operability tests to provide detection and assist in isolation of a fault to a hardware module level.

Any information processing system and especially a digital computer system requires several levels of tests or diagnostics to ensure operability. Typical software tests exercise only a small fraction of a computer system during a given time period. Hardware supported test capability, otherwise referred to as BIT, provides an added measure of system testing; however, cost impact prohibits this from being the complete diagnostic solution.

BIT has been achieved through three levels of activity, such as initial diagnostics, on-line BIT and off-line BIT. Initial diagnostic programs may comprise microdiagnostics and operability test routines that are performed when a computer system is initially turned-on or is engaged in an initial program load. On-line BIT includes all of those areas of fault monitoring activity that take place while a computer is operating, such as self-checking hardware fault monitors which continuously monitor critical points within a computer. Off-line BIT becomes necessary when an initial attempt at isolating a computer fault has failed requiring a more thorough testing procedure. By interfacing the computer under test to an external diagnostic exerciser via a maintenance port, off-line techniques such as Logic Scan Design (LSD), and Signature Analysis may be performed. Logic Scan Design is a method of serially linking internal hardware resulting in improved testability, particularly of Large Scale Integration (LSI) logic design. The method arranges for all internal logic states to be held in registers that can be serially accessed, allowing the internal states to be observed and controlled. After a repair is made, signature analysis involves the accumulation of thousands of internal test point sequences into one signature word which is read serially by the external diagnostic exerciser and checked for validity. The external diagnostic exerciser attempts to isolate a faulty module in a computer system by executing diagnostic routines while maintaining precise control over the internal state of the computer under test. On-line BIT comprises the use of microdiagnostic test routines, stored in a microprogrammed control unit, not only at power turn-on but also during normal computer operations, thereby providing a means for detecting a failure much earlier than would be otherwise possible. However, prior art attempts to employ microdiagnostics in a microprogrammed control unit have relied on forcing a computer or data processing system into an idle state of the system thereby terminating normal processing operations and have required significant amounts of additional dedicated hardware.

SUMMARY OF THE INVENTION

This invention discloses an information processing system having a microprogrammed control unit which performs a background microdiagnostic microprogram during the operation of a foreground program. A memory stores a plurality of microinstructions for performing both the background microprogram and the foreground program. The microprogrammed control unit includes a control sequencer for independently controlling the foreground program operation and the background microprogram by using two microprogram counters wherein a first microprogram counter participates in performing the foreground program and a second microprogram counter controls the background microdiagnostic microprogram without affecting the foreground program operation. The control sequencer further comprises a prediction/residual coding method for detecting microinstruction address and data errors. In addition, the background microdiagnostic microprogram comprises a plurality of test modules stored in the memory wherein each of the test modules test a particular portion of the information processing system and each of the test modules comprises a short cycle code for verification of the performance of each test module.

The invention further discloses a method for performing a background microprogram during the operation of a foreground program in an information processing system having a microprogramed control unit comprising the steps of storing a plurality of microinstructions for performing the background microprogram and the foreground program and controlling independently the foreground program operation and the background microprogram with at least two microprogram counters wherein a first microprogram counter participates in performing the foreground program and a second microprogram counter controls the background microprogram.

The invention further discloses a method of performing failure detection in an information processing system having a microprogrammed control unit which performs a background microprogram during the operation of a foreground program comprising the steps of storing a plurality of microinstructions for performing the background microprogram and the foreground program, each of said microinstructions having a first code for verification of an address of each one of said microinstructions and the contents of said address, controlling the foreground program and the background microprogram with at least two microprogram counters, generating a residual code from said first code representative of a code for a current microinstruction address, generating and storing a second code for a next microinstruction address during an immediate previously executed microinstruction operation and comparing the residual code to the stored second code for detecting a failure.

BRIEF DESCRIPTION OF THE DRAWINGS

Other and further features and advantages of the invention will become apparent in connection with the accompanying drawings wherein:

FIG. 6 is a hierarchy chart of the microdiagnostic test modules making up the operability microdiagnostics and the background microdiagnostics and showing the microprogrammed test modules shared by each;

FIG. 7 shows a sequence of test modules for a background microdiagnostic test and further shows a short cycle code which is generated by each test module and checked by a succeeding test module;

DESCRIPTION OF THE PREFERRED EMBODIMENT

Figure 1:
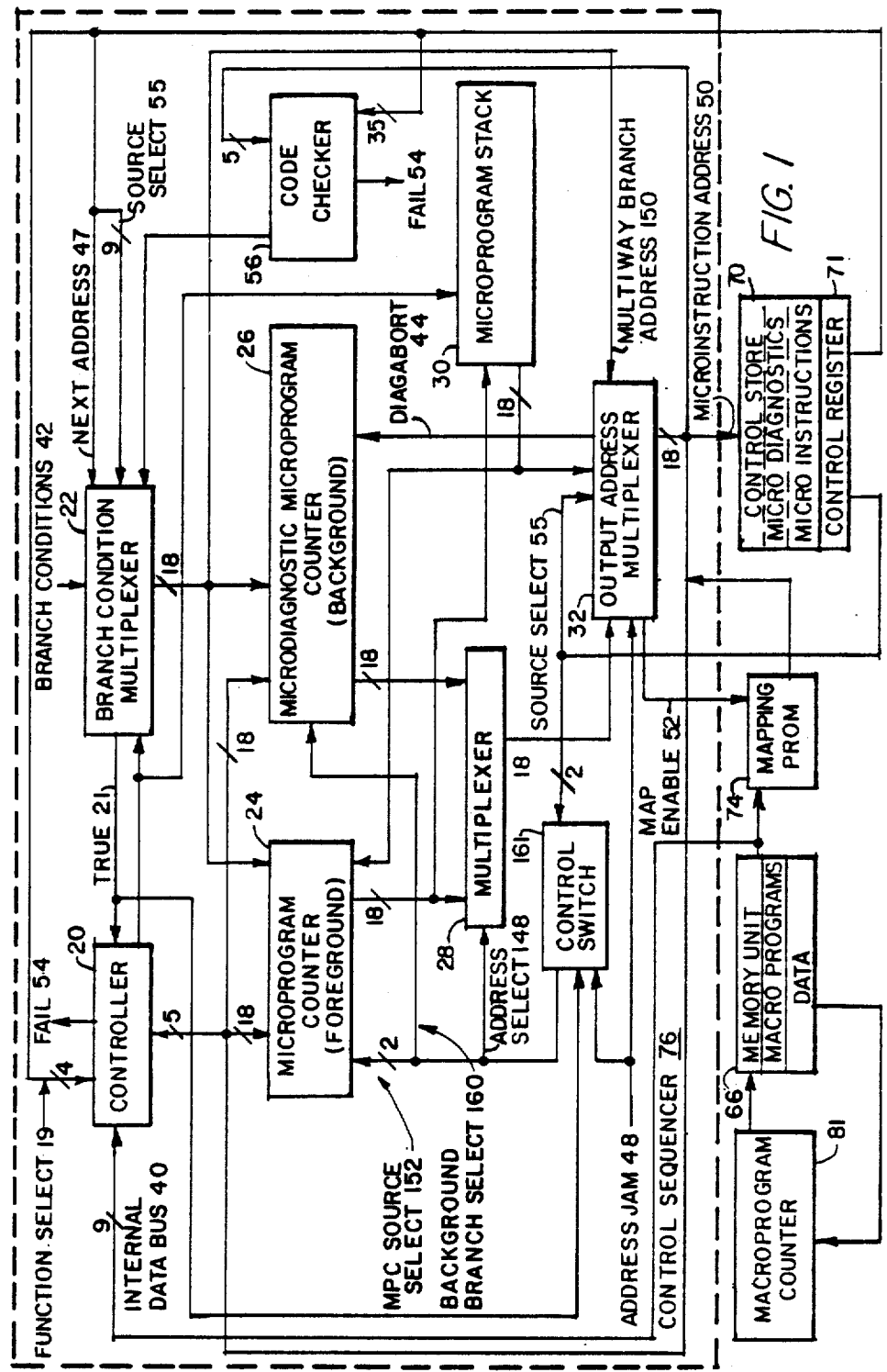
FIG. 1 is a block diagram of a microprogrammed control unit having a control sequencer comprising two microprogram counters according to the present invention.

A significant improvement in information processing built-in-test (BIT) capability is achieved according to the present invention, as shown in FIG. 1. This invention provides for the performance of on-line BIT microdiagnostic tests without interrupting a normally operating information processing system by the use of two independent microprogram counters. A first microprogram counter 24 participates in the operation of an operating foreground program that typically would be implementing a machine macroinstruction and a second microdiagnostic microprogram counter 26 controls the performance of background microdiagnostic tests being performed simultaneously during idle time intervals of the macroinstruction implementing the foreground program.

Macroprograms are performed using standard machine macroinstructions for performing a specific applications oriented task. A macroprogram is controlled by a macroprogram counter 81 according to the macroinstructions stored in a memory unit 66. An operation code from a macroinstruction obtained from memory unit 66 is coupled to mapping PROM 74 which determines a starting microinstruction address in control store 70 for the microprogram that will implement the macroinstruction specified by said operation code. The microprogram read from control store 70 is fed to control sequencer 76. Control sequencer 76 includes the two microprogram counters 24 and 26 mentioned above. Thus, microprogram counter 24 generates the address of the next micro-instruction for the macroinstruction being performed by a foreground program of the information processing system 60 shown in FIG. 2.

Referring to FIG. 1, microdiagnostic microprogram counter 26 generates an address of a next microdiagnostic microinstruction during the performance of background microdiagnostics which are run simultaneously with foreground macroprograms during the processing system 60 idle machine times or during operability microdiagnostic testing which is executed at power turn-on. Operability microdiagnostics are executed in a sequential manner under the control of microprogram counter 24 with no foreground programs in operation. Multiplexer 28 selects an output from either microprogram counter (MPC) 24 or microdiagnostic microprogram counter 26 in accordance with an address select 148 signal generated by control switch 161 logic based on specific control bits of a microinstruction coupled to the control switch 161 from the control register 71 coupled to control store 70. The output of multiplexer 28 connects to an output address multiplexer 32. The control switch 161 also generates the microprogram counter (MPC) source select 152 signals coupled to microprogram counter 24 and a background branch select 160 signal coupled to microdiagnostic microprogram counter 26 for switching between said microprogram counters 24 and 26 when the address of a next microinstruction is being selected.

The output of microprogram counter 24 is also coupled to a microprogram stack 30. The microprogram stack 30 comprises a stack and associated stack pointer logic for handling microprogram interrupt sub-routines. The microprogram stack is an eighteen bit wide, six level last-in/first-out (LIFO) register used during stack PUSH and POP operations. The stack pointer controls the stack operations by implementing a six state UP/-DOWN counter with parity predict logic. Parity predict logic, normally used in conjunction with a counter, predicts the next state of parity after a clocked counter operation. The six level stack stores the current microprogram counter location and corresponding code into a LIFO as determined by the stack pointer logic. PUSH operations store the microprogram counter; POP operations move the selected LIFO location onto the stack output. The embodiment and operation of a microprogram stack is known to one skilled in the art.

Figure 5:
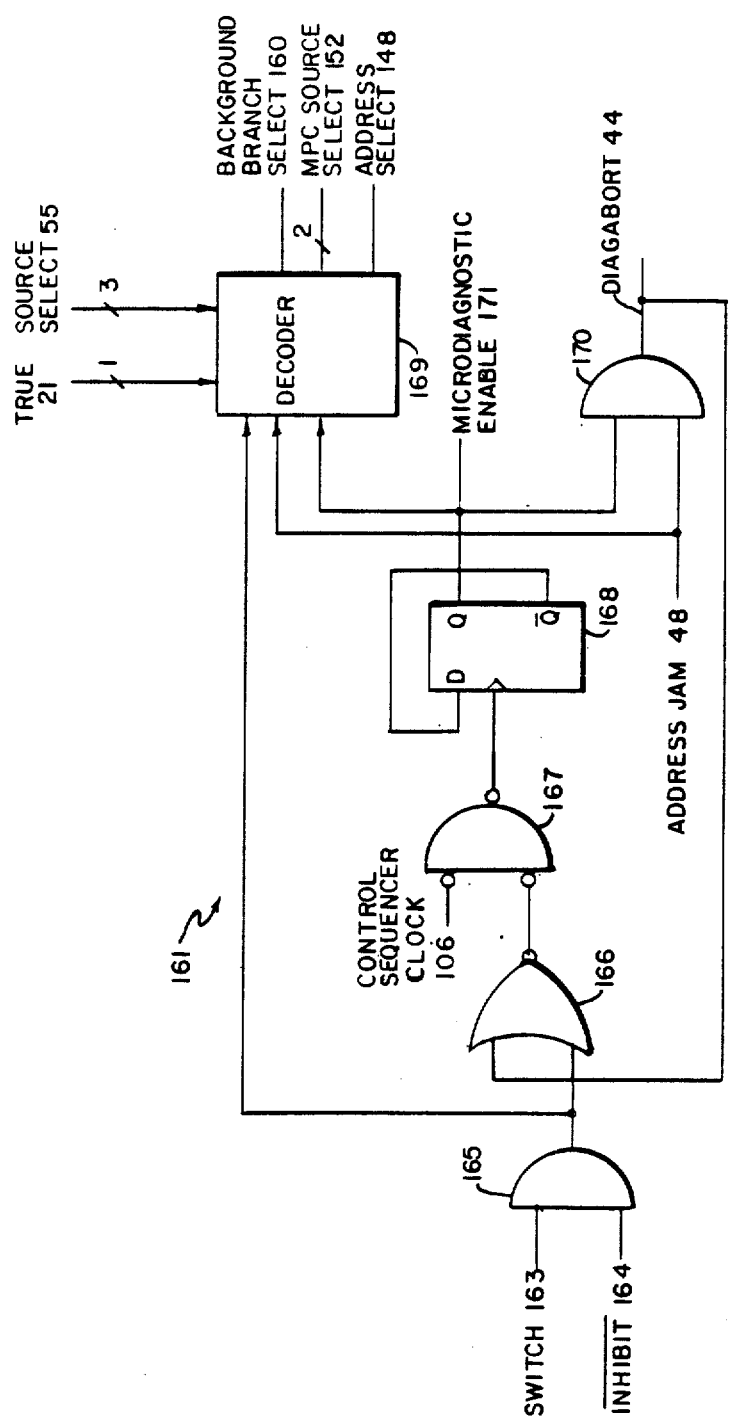
FIG. 5 is a logic diagram of the control switch as shown in FIG. 1 for controlling the switching between the two microprogram counters shown in FIG. 1.

The eighteen-bit output of the microprogram stack 30 connects to output address multiplexer 32 and microprogram counter 24. The other inputs to output address multiplexer 32 include an eighteen-bit word directly coupled from multiplexer 28, an address jam 48 signal which causes the termination of the current microprogram flow by transferring control to a predetermined address in control store 70, source select 55 signals from a microinstruction read-out of control store 70 via control register 71 and an eighteen-bit word comprising a 13 bit address and a 5 bit code from a branch condition multiplexer 22. An address jam 48 signal immediately suspends the current microdiagnostic microprogram being performed, places the content of the foreground microprogram counter onto the stack 30 and forces the address of the control store 70 to a predetermined state. If a background microdiagnostic is being executed, it is terminated, the background microprogram counter 26 is initialized to $(0001)_{16}$, the mode is switched to foreground and the foreground microprogram counter 24 content is placed onto the top of the microprogram stack 30. The output address multiplexer 32 selects a microinstruction address 50 for an entry point into a control store 70 from its various address inputs. A map enable 52 signal is also generated by the output address multiplexer 32. When a microinstruction address is generated by a mapping PROM 74, said address determines a microprogram entry address in control store 70. A microinstruction word from control store 70 provides two control signals to the input of the control switch 161 which are switch 163 and $\overline{\text{INHIBIT}}$ 164, as shown in FIG. 5 and described hereinafter.

Still referring to FIG. 1, a controller 20 receives inputs from an internal data bus 40, the branch condition multiplexer 22 and function select 19 signals from the control register 71. Controller 20 performs several logic functions for the control sequencer 76, such as decoding function select 19 codes and combining internal fault conditions into a single fault indication called fail 54. The output of controller 20 connects to branch condition multiplexer 22 and microprogram stack 30 and provides decoded functions by specifying operations to be performed. The branch condition multiplexer 22 receives signals from controller 20, control register 71, branch conditions 42 and code checker 56 and proceeds to generate a branch address which is coupled to microprogram counter 24, microdiagnostic microprogram counter 26 and output address multiplexer 32. Therefore, the source of a microinstruction address 50 may be from a branch condition, one of the microprogram counters 24 and 26, the microprogram stack 30 or an address jam 48, in addition to mapping PROM 74.

Only one of the two microprogram counters 24 and 26 is available to the output address multiplexer 32 at a time, depending on which executive mode is in effect, background or foreground. In either case, the available microprogram counter is loaded at the end of a microcycle with the value of the microprogram address incremented by 1, unless the executing microcycle is in the process of switching execution modes. In this situation, the output address multiplexer 32 is forced to supply a microinstruction address to control store 70 from the microprogram counter about to take control, while the currently available but outgoing microprogram counter is loaded with the address that it had intended to supply to the output address multiplexer 32. This will be the address to which the microprogram will return when execution control is returned to the outgoing microprogram counter. The control sequencer 76 is told to switch between the microprogram counters 24 and 26 from the microprogram itself as a result of preprogramming. The address of the microinstruction to be executed next is sourced from the microprogram counter taking control, and the address specified by a microinstruction source select field is routed into the outgoing microprogram counter.

Figure 2:
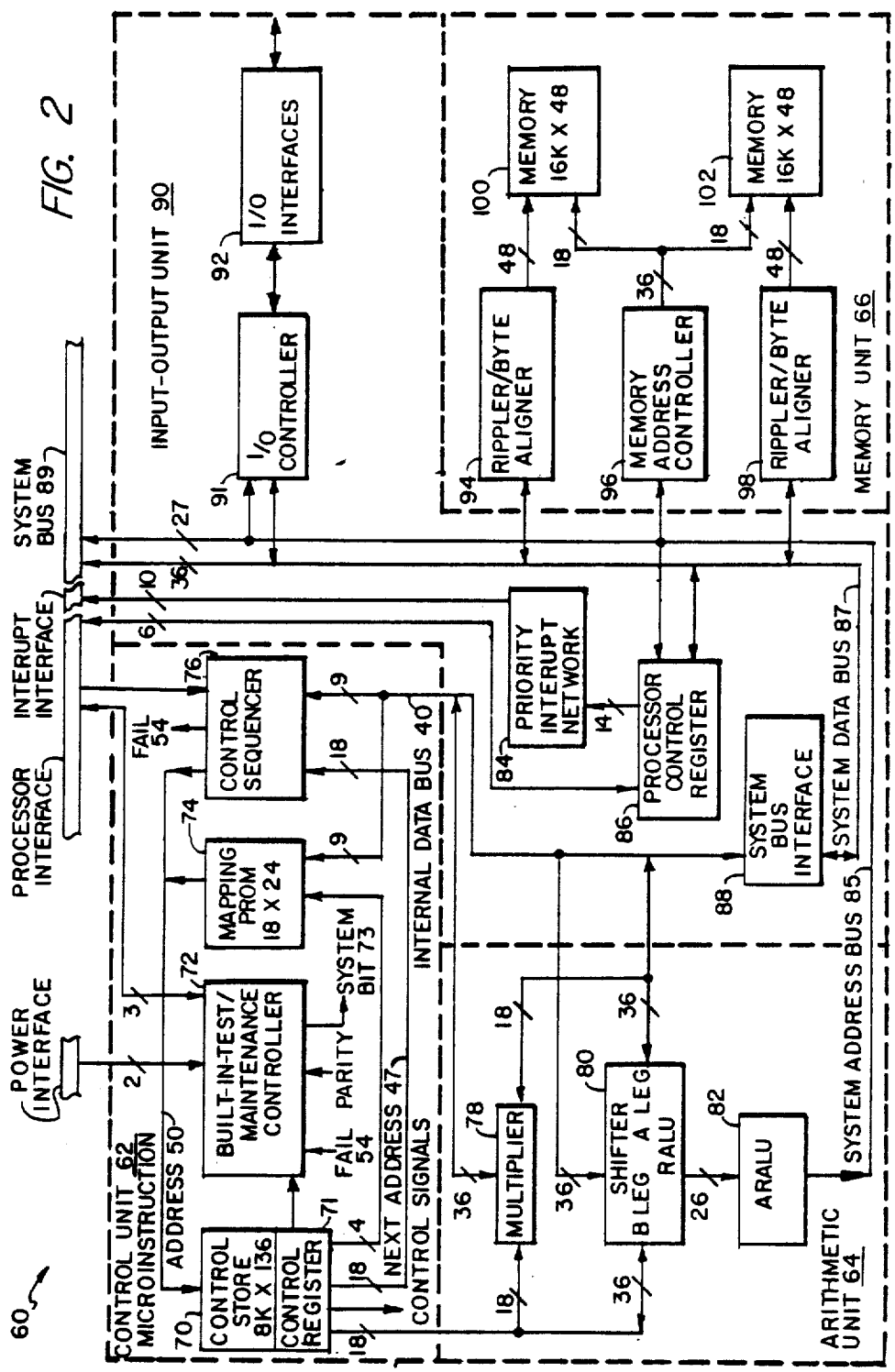
FIG. 2 is a block diagram of an information processing system showing the control sequencer of FIG. 1 as part of a microprogrammed control unit.

Referring now to FIG. 2, there is shown a block diagram of the information processing system 60 comprising a control unit 62, an arithmetic unit 64, a memory unit 66 and an input/output unit 90. The control unit 62 and the arithmetic unit 64 combined form a central processor which interfaces with the memory unit 66 and input/output unit 90 via a system bus 89 comprising a system address bus 85 and a system data bus 87.

Control unit 62 comprises control sequencer 76, as shown in FIG. 1 which provides a microinstruction address 50 to a memory or control store 70 as determined by inspection of microinstruction data, processor bus data, or several predetermined status conditions within the central processor. A next address decision is made once during each control sequencer system clock 106 cycle. Each microinstruction of a microprogram specifies the source of the address of the next step of the microprogram. The output of control store 70 includes a control register 71 having 136 bits which make up a microinstruction word. An 8K×24 bit mapping PROM 74, which is one of the several sources for a microinstruction address 50, translates operand codes and operand specifiers in the instruction stream from control register 71 or the internal data bus 40 into microinstruction addresses. A built-in test/Maintenance Controller (BMC) 72 is provided in each module of the information processing system 60 for gathering built-in-test (BIT) data status information. Each BMC 72 reports the system BIT 73 status information to a system level bit maintenance device which although not shown could reside in the input/output unit 90. Such a system level device determines which module or modules caused a fault based on an analysis of all failure reports and provides a fault indication.

Still referring to FIG. 2, arithmetic unit 64 comprises a register arithmetic logic unit (RALU) 80 which comprises a register array, including macroprogram counter 81, (as shown in FIG. 1) a multifunction ALU, shift and sign extension logic and a variety of data paths. The function performed by the RALU 80 are primarily determined by the microprogrammed control unit 62. The RALU 80 is coupled to internal data bus 40 which is coupled to a system bus interface 88. The RALU is also coupled to a multiplier 78 which is used for extended precision multiplications and for floating point operations. The embodiment of both an RALU 80 and a multiplier 78 is readily known to one having ordinary skill in the art. The RALU is also coupled to an Associative Registered Arithmetic Logic Unit (ARALU) 82 which functions as a memory management unit by associating a virtual address with virtual address bounds and then adding the appropriate relocation amount to the virtual address. The ARALU 82 may be embodied with two discrete ARALUs wherein one ARALU stores the virtual address bounds and the relocation amounts are stored in the register of a second ARALU. The first ARALU subtracts the incoming virtual address from each of 16 virtual address bounds. While this subtraction is occurring, the second ARALU adds the incoming virtual address with each of the 16 relocation amounts. When the first ARALU identifies the first virtual address bound, that is greater than or equal to the incoming virtual address, the entry position is sent to the second ARALU which then outputs the appropriate address to the system address bus 85.

Memory unit 66 comprises two 16K×48 bit random access memories 100 and 102, but can be easily expanded. A memory address controller 96 connects between a system address bus 85 and the memories 100 and 102; it performs all functions necessary for control of the memories 100 and 102. A first Rippler/Byte Aligner (RIBA) 94 connects between the system data bus 87 and memory 100 and a second Rippler/Byte Aligner (RIBA) 98 connects between the system data bus 87 and memory 102. The RIBA 94 and 98 are multifunction elements performing data alignment, byte and halfword transfers, error detection and correction, Rippler error correction and bus interfacing. The Rippler error correction is performed by replacing with its nearest neighbor any defective memory devices in a linear array of identical devices, then, replacing that device with its nearest neighbor, etc. The whole process "ripples" down the array of subelements until the last active device is replaced by the first available space. The advantage of this switching method over the more conventional direct substitution approach is in its amenability to relatively simple and reliably implemented control algorithms. Additional details of a Rippler are disclosed in U.S. Pat. No. 3,805,039 issued April 16, 1974 and assigned to the same assignee as the present invention.

An input-output unit 90 comprises an I/O controller 91 and an I/O interface 92. The I/O controller 91 executes I/O instructions and generates appropriate interrupts for controlling various I/O ports. The I/O interface 92 comprises specific interfaces such as standard peripheral equipment, parallel or serial interfaces. In addition, the input/output unit 90 includes a priority interrupt network 84 for handling interrupts, a processor control register 86 for holding information relevant to the current state of the information processing system and a system bus interface 88 for providing system bus control, system bus arbitration instruction prefetch control and storage and clock distribution and control.

Figure 3:
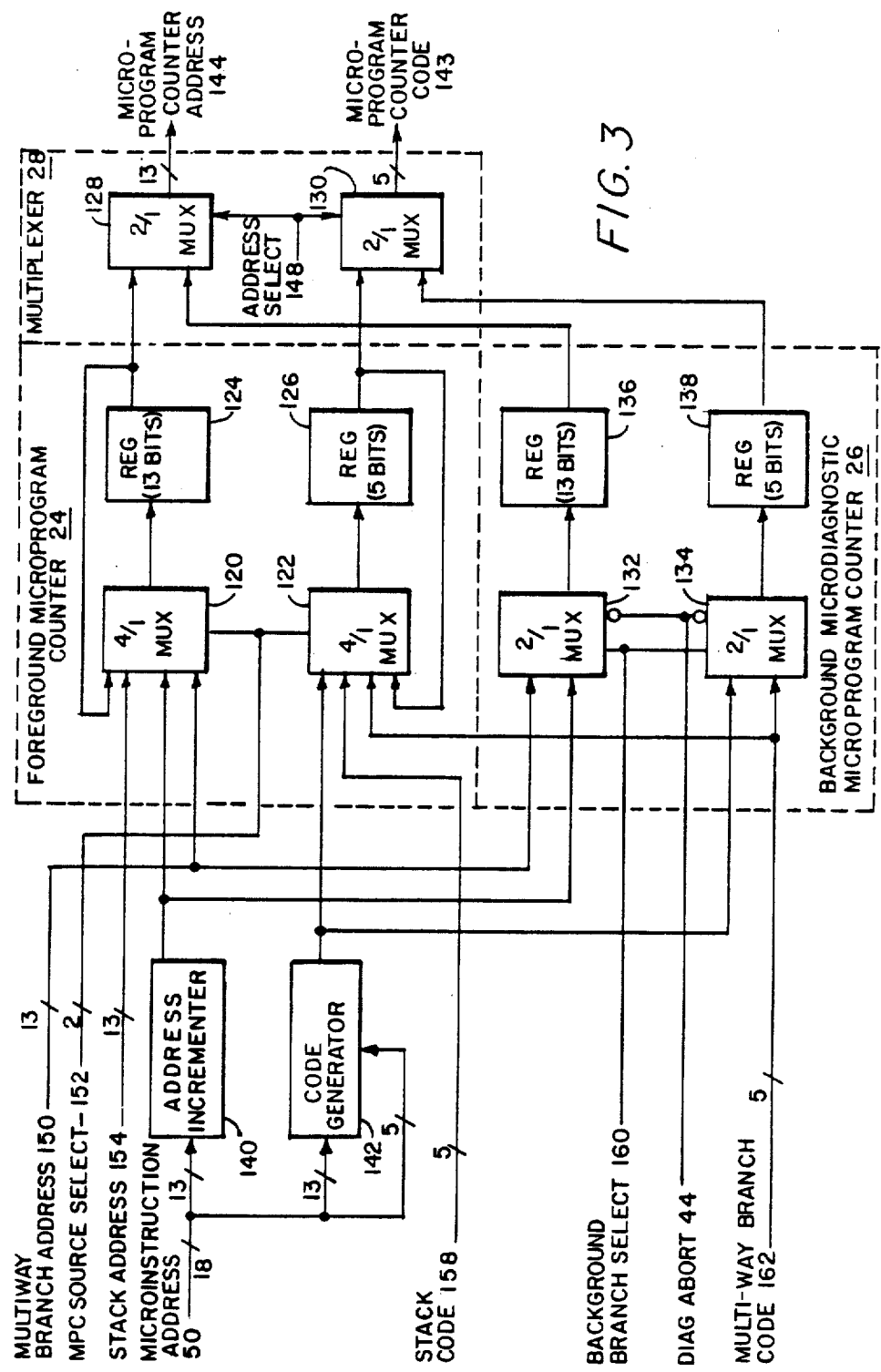
FIG. 3 is a block diagram of the hardware construction for implementing the two microprogram counters.
Figure 4:
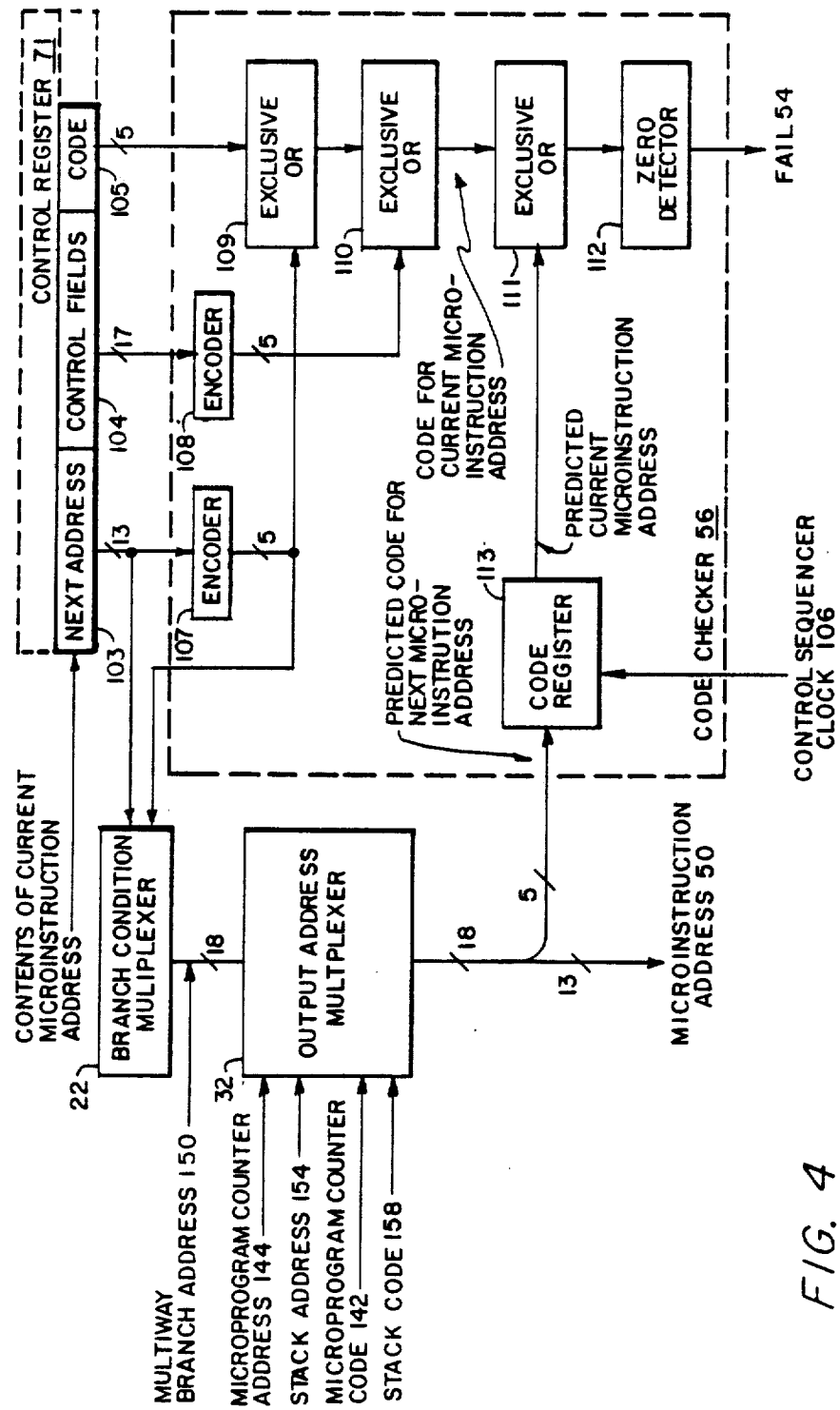
FIG. 4 is a functional block diagram showing the failure detection circuitry within the control sequencer for detecting microinstruction address and data errors.

Referring now to FIG. 3, a logic embodiment for the background microprogram counter 24 and the background microdiagnostic microprogram counter 26 is shown. Microprogram counter 24 comprises a 4/1 multiplexer 120 connected to a 13 bit register 124 which stores a microinstruction address. Also, a 4/1 multiplexer 122 is connected to a 5 bit register 126 for storing a microprogram counter code for detecting addressing errors. The 5 bit microprogram counter code is generated by code generator 142 as a function of the 13 bit microinstruction address. The generated code is compared in code checker 56, as shown in FIG. 1 and FIG. 4, to an equivalent code extracted from microcode bits which come into the control sequencer 76 from the control register 71 in order to check the control store 70 to the control sequencer 76 address path. Microprogram counter 24 also receives an address from the stack address 154 lines and an associated stack code 158 is provided for the microprogram counter code register 126.

The background microdiagnostic microprogram counter 26 comprises a 2/1 multiplexer 132 connected to a 13 bit register 136 for storing a microinstruction address and a 2/1 multiplexer 134 connected to a 5 bit register 138 for storing a 5 bit microprogram counter code. A microinstruction address 50 is incremented by address incrementer 140 prior to being stored in register 124 or register 136. Code generator 142 generates a microprogram counter code associated with a microinstruction address and described hereinafter in regard to FIG. 4. The foreground microprogram counter 24 receives an address via the multi-way branch address 150 lines, the stack 154 lines or the microinstruction address 50 lines when gated by an MPC source select 152 signal. The background microdiagnostic microprogram counter 26 receives an address via the microinstruction address 50 lines or the multi-way branch address 150 lines when gated by a background branch select 160 signal. When a microdiagnostic abort condition occurs, a DIAGABORT 44 signal is generated by an address jam 48, as shown in FIG. 5, causing control to be transferred to the foreground microprogram counter 24. The address select 148 signal selects whether a program counter address 144 and its associated program counter code 143 comes from the foreground microprogram counter 24 or the background microdiagnostic microprogram counter 26. The integrated circuits required to implement the logical functions shown in FIG. 3 are known to one of ordinary skill in the art.

Figure 9:
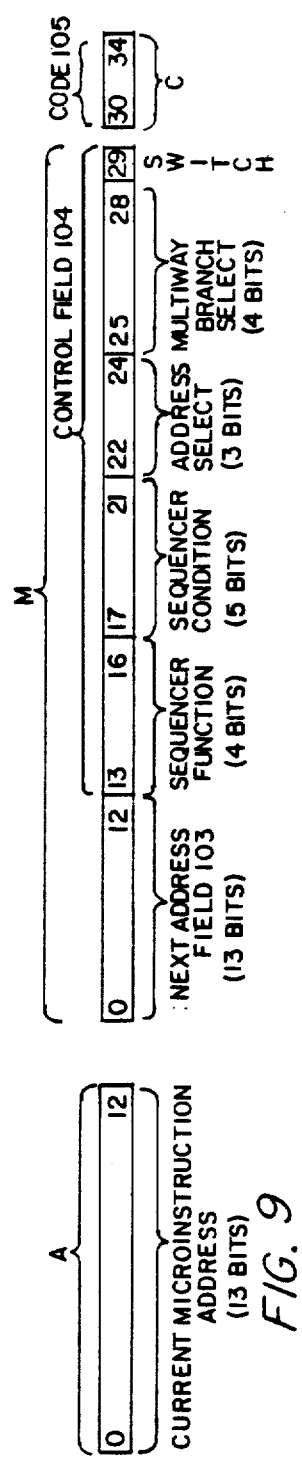
FIG. 9 shows a microinstruction address and the fileds of a microinstruction word stored in the microinstruction address.
Figure 10:
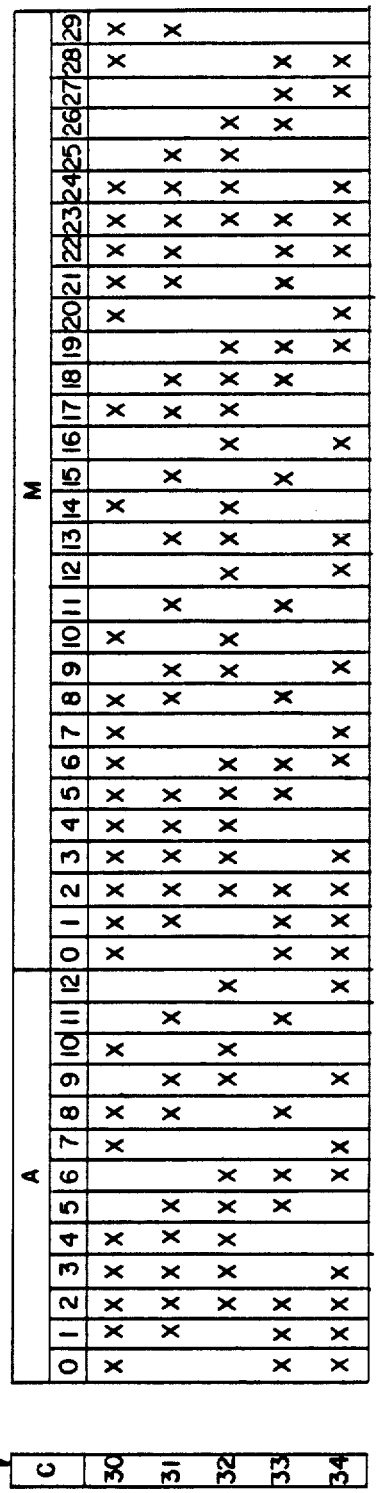
FIG. 10 illustrates a parity tree for the generation of a prediction/residual code utilized in the failure detection circuitry as shown in FIG. 4.

Referring now to FIGS. 4, 9 and 10, the failure detection circuits for detecting microinstruction address and data errors in the control sequencer 76 by a prediction/residual code method are shown. A cyclic parity code is generated by exclusive ORing the data bits within a particular microinstruction address, in the next address 103 field, the control field 104 and the microinstruction address itself, as shown in FIGS. 9 and 10, and the resulting cyclic parity code is placed in the code 105 field of the microinstruction. Logic within code checker 56 removes the contributions to this code of the next address 103 and control field 104. Encoder 107 connected to exclusive OR 109 removes the next address 103 field contribution and encoder 108 connected to exclusive OR 110 removes the control field 104 contribution, thereby presenting at the output of exclusive OR 110 a residual code which is a check on the current microinstruction address. A predicted code for the current microinstruction address was previously stored in code register 113. Therefore, exclusive OR 111 essentially performs a comparison between the predicted code and the residual code at its inputs and if the outputs of exclusive OR 111 which is connected to zero detector 112 is other than zero, FAIL 54 signal is generated. The previous microinstruction loaded code register 113 with the predicted code for the next address which by definition has to be identical to the residual code generated at the output of exclusive OR 110. The proper loading of code register 113 is controlled by a control sequencer clock 106 signal.

The branch condition multiplexer 22 receives a 13 bit next address 103 from control register 71 and an associated 5 bit code from encoder 107 for properly handling branching situations when the next microinstruction address 50 is not to be sourced from one of the microprogram counters 24 and 26. The output address multiplexer 32, as previously described selects the source for the next microinstruction 50 and the associated predicted code is sent to code register 113.

The prediction/residual code failure detection method verifies that data from the control store 70 via control register 71 was read correctly, that no failure occurred in any address lines of the control store 70, that there was no single data error in the control store output and that no data path error occurred between the control store 70 and the control sequencer 76.

Referring now to FIG. 5, the microdiagnostic control switch 161 is shown. Two microinstruction signals called switch 163 and $\overline{\text{INHIBIT}}$ 164 from the control store 70 control the operation of the control switch 161. Both signals have to be asserted to affect a switching operation. One of the signals $\overline{\text{INHIBIT}}$ 164 is used to inhibit the switching of modes (background and foreground). The $\overline{\text{INHIBIT}}$ signal is used when executing background diagnostics via the foreground microprogram counter by off-line testing and operability microdiagnostics. The D flip flop 168 generates the microdiagnostic enable 171 signal and thus initiates action for microprogram counter selection. AND gate 165 allows the toggling of D flip flop 168 if $\overline{\text{INHIBIT}}$ is a logic 0. NOR gate 166 gates the control sequencer clock 106 to the D flip flop 168 via AND gate 167. If an address jam 48 signal is activated when the background mode is enabled, (flip flop 168 is set) the DIAGABORT 44 signal becomes active (logic 1) causing the flip flop 168 to be reset, a termination of the background microprogram (background microprogram counter 26 is initialized) and transfer of the control sequencer to the foreground mode prior to execution of an address jam sequence. Further flexability is provided by allowing the microdiagnostic enable 171 to be used as a branch condition and identify whether background microdiagnostics or operability microdiagnostic testing is in progress.

Still referring to FIG. 5, this control switch 161 is automatically transferred to foreground operation if an address jam 48 occurs during execution of background microdiagnostics. This condition generates the DIAGABORT 44 signal which is used to initialize the background microprogram counter to $(0001)_{16}$ and force a background microdiagnostic routine to restart. The AND gate 165 output, microdiagnostic enable 171 and the address jam 48 along with TRUE 21 from the branch condition multiplexer 22 and source select 55 from the control register 71 are inputs to a decoder 169 which developes four outputs to control the microprogram counters 24 and 26 and multiplexer 28. Background branch select 160 controls loading of the background microdiagnostic microprogram counter 26, the MPC source select 152 controls the loading of the foreground microprogram counter, and the address select 148 signal selects either the foreground microprogram counter or background microdiagnostic microprogram counter and associated microprogram counter code via the multiplexer 28.

Microdiagnostic test microcoded routines utilized in conjunction with BIT hardware and a macro-operability tests provide fault detection and assist in fault isolation to a module hardware level. The macro-operability tests are performed after microdiagnostic tests are used to ascertain the fundamental operability of an information processing system. Microdiagnostics can be subdivided into operability microdiagnostics and background microdiagnostics. The operability microdiagnostics support the macro-operability tests and are performed during initial power-up of a system by testing hardware circuitry that would prevent the execution of the first macro-operability instruction if faulty. Operability microdiagnostics and background microdiagnostics work together towards attaining a high percentage of fault detection and to assist in fault isolation by testing circuitry which is either untestable or inefficient to test using BIT hardware exclusively.

Referring now to FIG. 6, the organization of the microdiagnostics as a hierarchy structure is shown. Each box in FIG. 6 represents a microprogrammed test module and may be either a control or a test module. Control modules consist of two or more call instructions and a return instruction. A control module will call either a subordinate control module or a test module. Test modules explicitly test functional hardware areas of the information processing system 60. Examples of control modules are the executive 178 operability microdiagnostics 180 and background microdiagnostics 181. The background microdiagnostics 181 ar comprised entirely of test modules such as ROM 186, control sequencer 187, floating point 188, registered arithmetic logic unit 189 and register 190 modules. The microdiagnostics are designed so that operability microdiagnostics 180 and background microdiagnostics 181 share microprogrammed test modules or common microinstruction code as indicated in FIG. 6. A fault 182 module is called by the microprograms when a failure is detected. The object of the fault 182 module is to establish a stable system state (i.e. jump to self) and alert the BIT maintenance controller 72 of the failure.

Each functional test module has a short cycle code specified for that function. The code is generated in one module and passed as a parameter to the next module. The next module will, upon program entry, test the passed short cycle code value and if wrong, BIT hardware will be notified of a fault. The short cycle code is generated by incrementing the passed code with a constant. Short cycle code is tested when performing background microdiagnostics 181 and operability microdiagnostics 180.

A complete operability microdiagnostic test sequence comprises performing all of the test modules shown in FIG. 6 comprising system bus interface 183, priority interrupt network 184, RAM 185, ROM 186, control sequencer 187, floating point 188, and registered arithmetic logic unit 189. A complete sequence of background microdiagnostics comprises performing the following test modules: ROM 186, control sequencer 187, floating point 188, registered arithmetic logic unit 189 and register 190. The ROM 186, control sequencer 187, floating point 188 and registered arithmetic logic unit 189 test modules are the same test modules for both operability microdiagnostics 180 and background microdiagnostics 181, which minimizes the amount of control store 70 that is required.

The operability microdiagnostics 180 support assembly language macro-operability tests (software tests) performed immediately following an initial program load and power-up of an information processing system by testing circuitry that would prevent the execution of the first macrooperability instruction. The operability microdiagnostics 180 will not preserve the previous state of an information processing system, and assumes that the hardware hard core (minimal amount of circuitry required to start the first microdiagnostic test) is operational. The operability microdiagnostic s180 build on that hard core by testing additional circuitry until all required testing is completed; they are performed under the control of the foreground microprogram counter 24. After completion of the operability microdiagnostics, the assembly language macro-operability test is executed.

Figure 8:
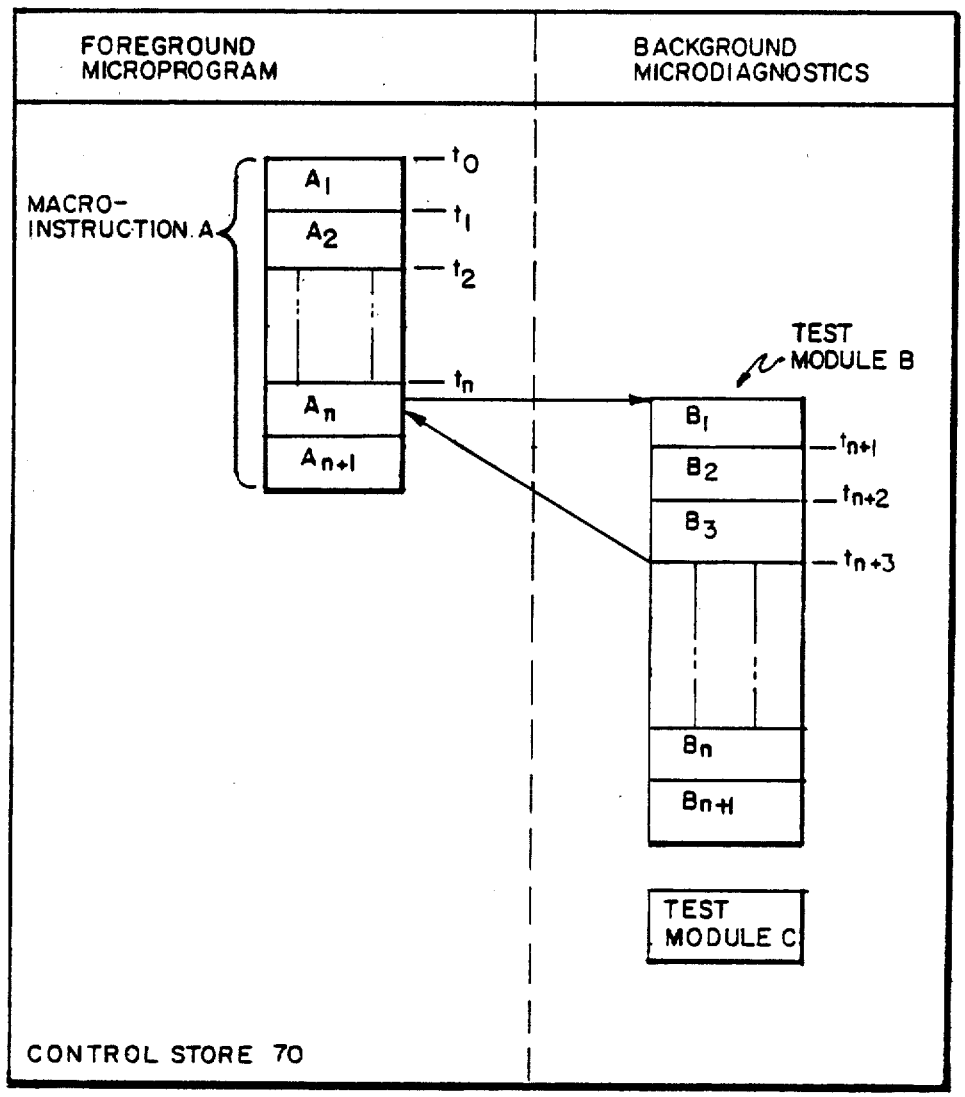
FIG. 8 illustrates the switching from a foreground microprogram to a background microdiagnostic microprogram in order to execute three microinstructions prior to returning to the foreground microprogram.

The background microdiagnostics 181 are performed during processor idle machine times. The control sequencer 76 of a microprogrammed control unit 62 comprises two microprogram counters 24 and 26, as previously described, which work simultaneously during execution of assembly language programs. Since the background microdiagnostic tests are executed during idle machine times employing the background microprogram counter 26, these tests are transparent (timewise) to any user programs. The background microdiagnostics are executed three microinstructions at a time, as illustrated in FIG. 8, to allow more complete testing. FIG. 8 shows a control store 70 comprising a foreground microprogram for implementing a macroinstruction A and comprising microdiagnostic test modules B and C. During the execution of microinstruction $A_n$, at time $t_n$, two control signals from said microinstruction $A_n$ cause program control to switch to the background microprogram counter 26 whereby, in this illustration, microdiagnostic test module B is executed three instructions at a time. At the conclusion of the third microinstruction ($B_3$) program control is switched back to the foreground microprogram counter 24 and the execution of microinstruction $A_n$ is completed. The background microdiagnostics 181, due to the nature of their execution, do not change the state of a computer system or an information processing system 60. The intent of background microdiagnostics 181 is to continually exercise functions not tested by on-line BIT and to alert a bit maintenance controller 72, as shown in FIG. 2, upon detection of a fault. The idle times during which background microdiagnostics 181 are executed include periods where a memory access does not overlap microcode execution or when a processer must wait for another operation to be completed. Also, certain instructions have periods of inactivity (wait state) and additionally, a periodic time-out every millisecond may be used to ensure failsafe operation of background microdiagnostics.

Referring now to FIGS. 1 and 2, the method of operation of microdiagnostics is as follows: assume that the foreground microprogram counter 24 is being used to execute a string of microinstructions to implement a machine macroinstruction or an instruction set architecture (ISA) operation which requires a fetch from memory unit 66. The memory fetch is initiated and the processor comprising control unit 62 and arithmetic unit 64 begins waiting for the system data bus 87 to present valid data. Jointly with the initiation of the memory fetch, the ISA operation macroinstruction transfers control to the background microprogram counter 26 by means of the control switch 161. The control sequencer 76 is thereby switched to a background mode and a background microdiagnostic test controlled by the microdiagnostic microprogram counter 26 executes three microinstructions $B_1$, $B_2$ and $B_3$, as shown in FIG. 8, from one of the test modules shown in FIG. 6. At the conclusion of the execution of the third microinstruction, the microdiagnostic test generates control signals (SWITCH 163 and $\overline{\text{INHIBIT}}$ 164 to cause a swap microprogram counter action which transfers control back to the foreground microprogram counter 24. This procedure continues until all test modules making up a microdiagnostic test are completed.

Microdiagnostic tests in the background mode do not alter the operational state of the processor and avoid exercising any state which could effect ISA execution (such as general purpose flags, data registers or overflow). The foreground mode of operation is not aware f the execution of background mode microdiagnostics.

Referring now to FIG. 7, a typical background microdiagnostic program sequence is shown comprising control sequencer 187, registered arithmetic logic unit 189, floating point 188 and register 190 test modules. The name of a test module indicates the functional area of a system being tested. Each test module generates a short cycle code (SCC). When background mode microdiagnostics are enabled and a new functional test module is entered, the short cycle code generated by the previous test module is passed as a parameter to the next module in the execution sequence and checked. If the passed code is determined to be wrong, BIT hardware is notified of a fault. Short cycle code is tested in both operability and background microdiagnostic tests. This short cycle code guarantees that a complete microdiagnostic sequence of test modules is executed and not just a subset of test modules due to a latency failure. The principal reason for performing background microdiagnostics is to reduce failure latency time or the time it takes to discover a failure condition.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A processing system for executing a stored primary program comprising:
    memory means for storing a microinstruction secondary program and microinstructions for implementing macroinstructions of said primary program, said secondary program being used for microdiagnostic testing;
    control sequencer means coupled to said memory means and responsive to a macroinstruction of said primary program for enabling said processing system to execute said stored secondary program simultaneously with the execution of said primary program without increasing said primary program execution time, said macroinstruction of said primary program being implemented by at least one of said microinstructions stored in said memory means; and
    said control sequencer means comprises at least two microprogram counters for controlling the simultaneous operation of said primary program and said secondary program.

2. The processing system as recited in claim 1 wherein:
    a first of said two microprogram counters controls the addressing of microinstructions for executing said primary program and a second of said two microprogram counters controls the addressing of microinstructions for performing said secondary program.

3. An information processing system having a microprogrammed control unit which performs a background microprogram during the operation of a foreground program comprising:
    memory means for storing a plurality of microinstructions for performing said background microprogram during the operation of said foreground program without increasing said foreground program execution time; and
    control sequencer means coupled to said memory means for independently controlling said foreground program operation and said background microprogram operation including at least two microprogram counters wherein a first microprogram counter controls the sequencing of microinstructions for performing said foreground program and a second microprogram counter controls said background microprogram.

4. The information processing system as recited in claim 3 wherein:
    said background microprogram comprises a plurality of microinstruction test modules for performing microdiagnostic testing.

5. The information processing system as recited in claim 3 wherein:
    said control sequencer means further comprises control switch means coupled to said first microprogram counter and said second microprogram counter for switching control between said first microprogram counter and said second microprogram counter in accordance with a signal from at least one of said microinstructions.

6. The information processing system as recited in claim 3 wherein:

said background microprogram comprises a plurality of test modules stored in said memory means, each of said test modules comprising means for generating and testing a short cycle code to verify the performance of said test modules.

7. An information processing system having a microprogrammed control unit which performs a background microprogram during the operation of a foreground program comprising:

memory means for storing a plurality of microinstructions for performing said background microprogram during the operation of said foreground program without increasing said foreground program execution time;

control sequencer means coupled to said memory means for independently controlling said foreground program operation and said background microprogram including at least two microprogram counters wherein a first microprogram counter participates in performing said foreground program and a second microprogram counter controls said background microprogram; and coding means coupled to said microprogram counters within said control sequencer means for generating a predicted code to detect an error in a microinstruction address generated by said control sequencer means.

8. The information processing system as recited in claim 7 wherein:

said microprogrammed control unit further comprises a means for switching control between said first microprogram counter and said second microprogram counter in accordance with a plurality of switch control signals from one of said microinstructions.

9. The information processing system as recited in claim 7 wherein:

said coding means having inputs coupled to said microinstruction address further comprises means for determining that a code located in the contents of said microinstruction address verifies said predicted code for said microinstruction address.

10. The information processing system as recited in claim 9 wherein:

said coding means further comprises means for generating a fail signal when a code verification error is detected.

11. An information processing system having a microprogrammed control unit comprising:

memory means for storing a plurality of microinstructions for performing a background microdiagnostic microprogram during the operation of a foreground program without increasing said foreground program execution time;

a first microprogram counter for generating an address of a next microinstruction of a macroinstruction during the performance of said foreground program;

a second microprogram counter for generating an address of a next microinstruction of said background microdiagnostic microprogram;

a multiplexer means connected to said first microprogram counter and said second microprogram counter for selecting an address of said next microinstruction from either said first microprogram counter or said second microprogram counter in accordance with an address select signal; and control switch means coupled to said memory means for generating said address select signal in accordance with a switch control signal from one of said microinstructions.

12. An information processing system having a microprogrammed control unit comprising:

memory means for storing a plurality of microinstructions for performing a background microdiagnostic microprogram during the operation of a foreground program;

a first microprogram counter for generating an address of a next microinstruction during the performance of said foreground program;

a second microprogram counter of generating an address of a next microinstruction of said background microdiagnostic microprogram;

a multiplexer means connected to said first microprogram counter and said second microprogram counter for selecting an address of said next microinstruction from either said first microprogram counter or said second microprogram counter in accordance with an address select signal from said memory means;

microprogram stack means connected to said first microprogram counter for performing microprogram interrup subroutines;

branch condition multiplexer means connected to said first microprogram counter, said second microprogram counter and an output address multiplexer for generating an address of said next microinstruction in accordance with branch condition signals from within said information processing system;

said output address multiplexer means receiving an address jam input signal from within said information processing system and coupled to output signals of said multiplexer means, said stack means and said branch condition multiplexer means for selecting a source of said next microinstruction address;

control switch means coupled to said memory means for switching control between said first microprogram counter and said second microprogram counter; and controller means coupled to said memory means, to said output address multiplexer, to said branch condition multiplexer means and said microprogram stack means for decoding function codes from said memory means.

13. An information processing system having a microprogrammed control unit comprising:

memory means for storing a plurality of microinstructions for performing a microdiagnostic test and a macroinstruction of a foreground program;

a first microprogram counter for generating an address of a next microinstruction for performing a macroinstruction;

a second microprogram counter for generating an address of a next microinstruction of background microdiagnostic tests being performed during the operation of said foreground program without increasing said macroinstruction execution time, said foreground program macroinstruction being under the control of a macroprogram counter; and control switch means coupled between said memory means and said first and second microprogram counters for determining the source of said address of a next microinstruction.

14. A microprogrammed control unit comprising:
memory means for storing a plurality of microinstructions to perform a background microdiagnostic microprogram simultaneously with the operation of a foreground program being implemented by at least one microinstruction stored in said memory means without increasing the execution time of said foreground program; and
control sequencer means coupled to said memory means for independently controlling said foreground program operation and said background microdiagnostic microprogram, said control sequencer means including at least two microprogram counters wherein a first microprogram counter controls the sequencing of microinstructions for performing said foreground program and a second microprogram counter controls said background microdiagnostic microprogram.

15. The microprogrammed control unit as recited in claim 14 wherein:
said control sequencer means further comprises means for switching control between said first microprogram counter and said second microprogram counter in accordance with a signal from at least one of said microinstructions.

16. The microprogrammed control unit as recited in claim 14 wherein:
said background microdiagnostic microprogram comprises a plurality of test modules stored in said memory means, each of said test modules comprising means for generating and testing a short cycle code to verify the performance of said test modules.

17. A method for executing a primary program stored in a main memory while simultaneously performing microdiagnostic testing in a processing system comprising the steps of:
storing a secondary program of microdiagnostic microinstructions in a control store memory means;
executing said stored secondary program simultaneously with the execution of a macroinstruction of said primary program without increasing the execution time of said macroinstruction, said macroinstruction being implemented by at least one microinstruction stored in said control store memory means; and
controlling the simultaneous operation of said primary program and said secondary program with at least two microprogram counters for addressing said control store memory means.

18. A method in an information processing system having a microprogrammed control unit for performing a background microdiagnostic microprogram during the operation of a foreground program comprising the steps of:
storing in a control store means a plurality of microinstructions for performing said background microdiagnostic microprogram and said foreground program; and
controlling independently said foreground program operation and said background microprogram operation with at least two microprogram counters in a control sequencer coupled to said control store means wherein a first of said microprogram counters controls the sequencing of microinstructions for performing said foreground program and a second of said microprogram counters controls the operation of said background microdiagnostic microprogram without increasing the execution time of said foreground program.

19. A method as recited in claim 18 wherein: the step of controlling independently said foreground program operation and said background microdiagnostic microprogram comprises switching control between said first microprogram counter and said second microprogram counter in accordance with a signal from at least one of said microinstructions.

20. The method as recited in claim 18 wherein:
the step of performing a background microdiagnostic microprogram comprises performing a plurality of test modules, and generating and testing in each of said test modules a short cycle code to verify the performance of said test modules.

21. A method of performing failure detection in an information processing system having a microprogrammed control unit which performs a background microprogram simultaneously with the operation of a foreground program without increasing said foreground program execution time comprising the steps of:
storing a plurality of microinstructions for performing said background microprogram and said foreground program, each of said microinstructions having a first code for verification of an address of each one of said microinstructions and the contents of said address;
controlling said foreground program and said background microprogram with at least two microprogram counters, an output from each of said microprogram counters being selected by a first signal generated by a control switch means in accordance with a second signal to said control switch means from one of said microinstructions;
generating a residual code from said first code representative of a code for a current microinstruction address;
generating and storing a second code for said microinstruction address during a previously executed microinstruction; and
comparing said residual code to said second code for detecting a failure.

* * * * *